Inventor:
Adolf Huber.

Inventor:
Adolf Huber.

Inventor:
Adolf Huber.

Patented Mar. 2, 1943

2,312,645

UNITED STATES PATENT OFFICE 2,312,645

TREADLE LEVER DRIVE, ESPECIALLY FOR BICYCLES

Adolf Huber, Uetikon, Switzerland

Application May 9, 1941, Serial No. 392,744

1 Claim. (Cl. 74—42)

The present invention relates to a treadle lever drive, especially for bicycles, fitted with double arm levers going substantially up and down, each of which being pivoted intermediately to a crank arranged in the threadle bearing of the bicycle.

There are well known treadle lever driving devices of this kind in which an auxiliary crankshaft is provided, which, by means of a crank loop or a pair of toothed wheels, is in driving connection with the main crankshaft supported in the treadle bearing.

The use of crank loops, however, is detrimental, inasmuch as between the crank of the main and the auxiliary crankshaft the length of the lever arm altered considerably during one crank revolution, i. e. by the diameter of the crank circle of the auxiliary crankshaft. Consequently the torque exerted on the driving wheel varies continuously according to magnitude, even, if the driver transmits comparatively regular power to the cranks.

The coupling of the main and auxiliary crankshaft by a pair of toothed wheels, whereby main and auxiliary crankshafts describe counteracting rotary movements, requires, however, very big pitch circle diameters of the toothed wheels if the normal cog on the treadle bearing is to be maintained. Thereby the whole driving mechanism becomes very unwieldly and clumsy, and, apart from the additional weight, the body is unattractive in appearance. But, if the pitch circle diameter of both toothed wheels is reduced to a reasonable measure, then, with the preservation of the given gear ratio between the treadle bearing cog and the rear sprocket wheel, these two wheel sprockets must be of a very small design. However, especially with regard to the rear wheel cog, this leads to inadequacy and also considerable increase of the chain friction.

The present invention is intended to eliminate all these drawbacks. For this purpose the use of an auxiliary crankshaft can entirely be dispensed with. In its stead, according to the invention, each of the treadle levers is on its rear end, opposite the pedal, by means of two links, in joint connection with a switch gear coupled with the treadle bearing crankshaft in one rotary direction only. The two joint axles of each link hinged to the treadle lever are guided in curved paths formed on members fixed to the bicycle frame on both sides thereof.

The nature of the invention will be understood from the following specification taken with the accompanying drawings in which one embodiment is illustrated.

Figure 3:
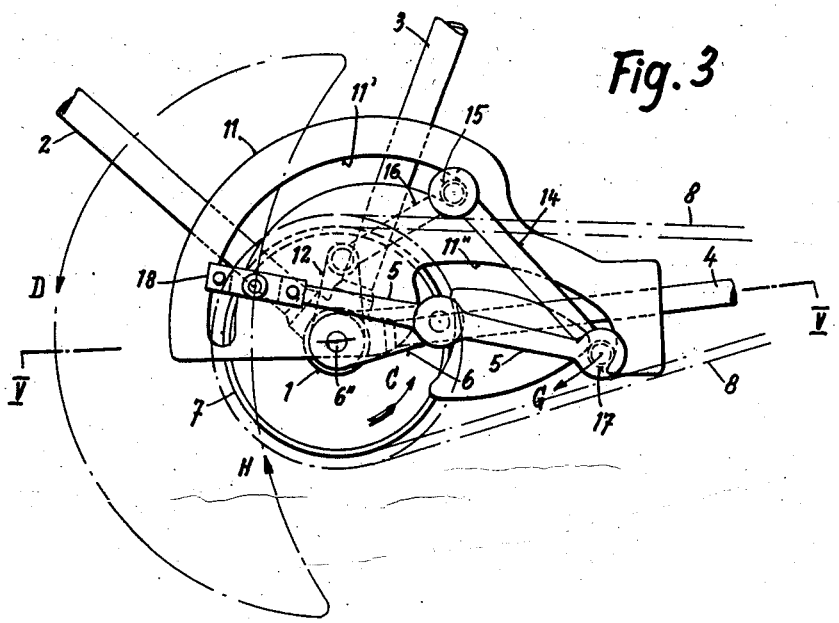
Fig. 3 is the same side view of the treadle lever drive with the pedal on its return to the initial position for the power stroke.
Figure 4:
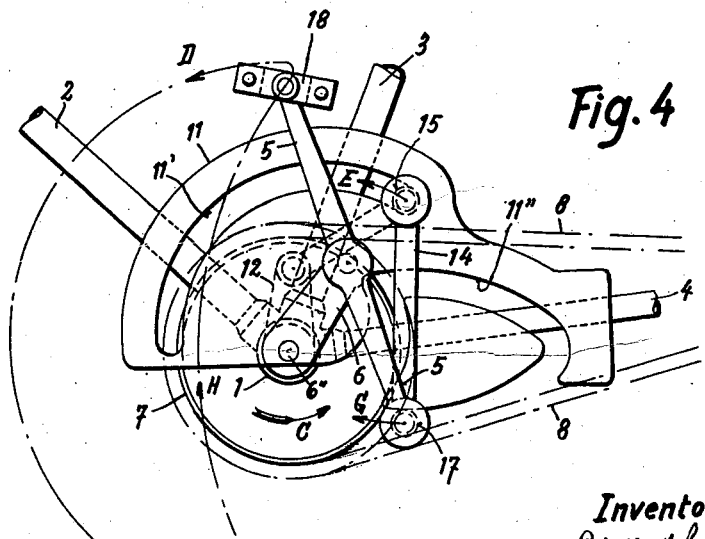
Figure 5:
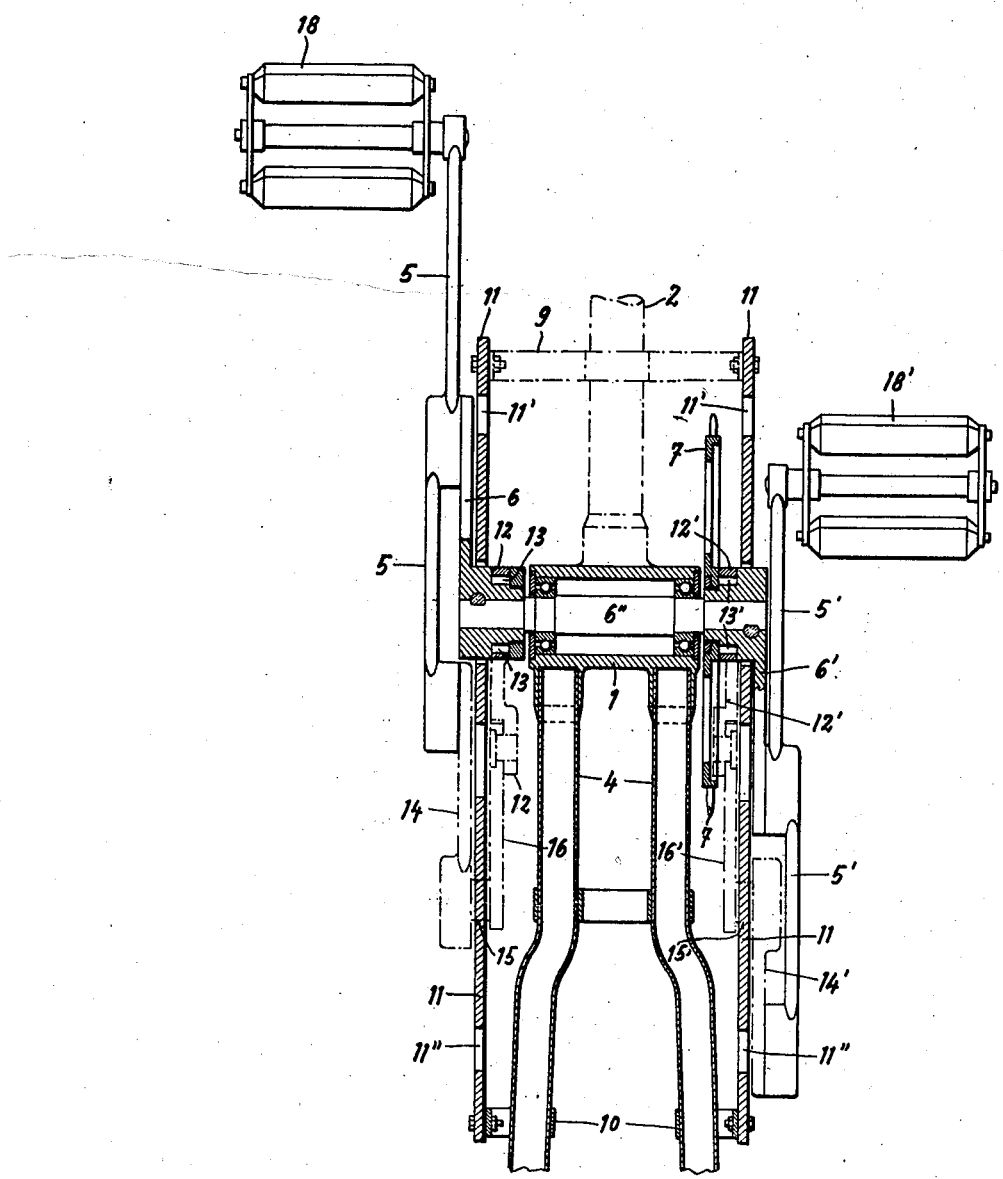

Fig. 4 the same side view of the treadle mechanism with the substantially upwardly positioned treadle lever and the pedal close to its top dead centre, and Fig. 5 shows a horizontal section of the crank drive, substantially taken on the line V—V' of Fig. 3 with the treadle levers in horizontal position.

In the illustrated example 1 designates a common treadle bearing arranged at the point of junction of the bicycle frame tubes 2, 3 and 4. Among these frame tubes, tube 2 connects in a well known manner the treadle bearing 1 with the front-wheel fork guide (not shown), tube 3 leading from treadle bearing 1 to the saddle pillar and the tubes 4 connecting the treadle bearing 1 with the rear wheel guide of the cycle.

With 5 and 5' two double arm treadle levers are designated, each of which being pivoted intermediate its ends to crank 6 respectively 6', the latter arranged in staggered relation to each other at an angle of 180 degrees on a crankshaft 6'' supported by treadle bearing 1. 7 is a common wheel sprocket has its chain 8 leading to the rear wheel gear of the bicycle.

On the frame tubes two plates 11 fitted with curved paths 11' and 11'' are interconnected by means of ties 9 and 10 (Fig. 5) parallel to the general plane of the cycle. As shown, the primary path 11' and the secondary path 11'' are both eccentered from the cranks 6, 6' but their degrees of eccentricity are different from each other. Inside of each of these plates a lever 12 respectively 12' is mounted on the hub of the neighboring crank 6 respectively 6' by means of a switch gear with locking rollers 13, 13'. This switch gear is revolubly connected with cranks 6, 6' in one direction of rotation only, whereas in the other direction it runs idle. On each treadle lever a link 14 respectively 14' is hinged, the other joint axle of which is guided by means of a roller 15 respectively 15' in the one curved path 11' of plate 11. A second link 16 respectively 16' connects this joint axle guided in the curved path with each of the neighboring levers 12 respectively 12'. Further rollers 17, 17' are provided on the joints between the treadle levers 5, 5' and the links 14, 14'.

The mode of operation of the aforedescribed treadle mechanism is as follows. Assuming the individual parts of the driving device to be at their initial point, i. e. in the position shown in Fig. 1, if now a pressure is exerted on pedal 18 of the left-hand treadle lever 5 in the direction as indicated by arrow A of Fig. 1, it produces on the crank 6 an anti-clockwise torque—according to the drawing—which is transmitted in the usual way over sprocket wheel 7 and chain 8 onto the rear wheel gear of the bicycle. On pushing pedal 18, a reaction-pressure takes place in the rear joint 17 of treadle lever 5, however, in the direction of arrow B, thus producing likewise over link 14, link 16 and lever 12 an anti-clockwise torque on the crankshaft 6" of the treadle bearing. This torque is communicated over chain drive 7, 8 to the rear wheel gear of the bicycle, and added to the torque operative on crank 6.

As soon as these two torques exceed the moment of the movement resistance of the rear wheel, the bicycle starts, whereby cranks 6 and 12 turn simultaneously in the direction indicated by arrow C and pedal 18 begins to move downwards in the way indicated by arrow D. At the same time roller 15 moves in the curved path 11' in the direction as indicated by arrow E.

Figure 1:
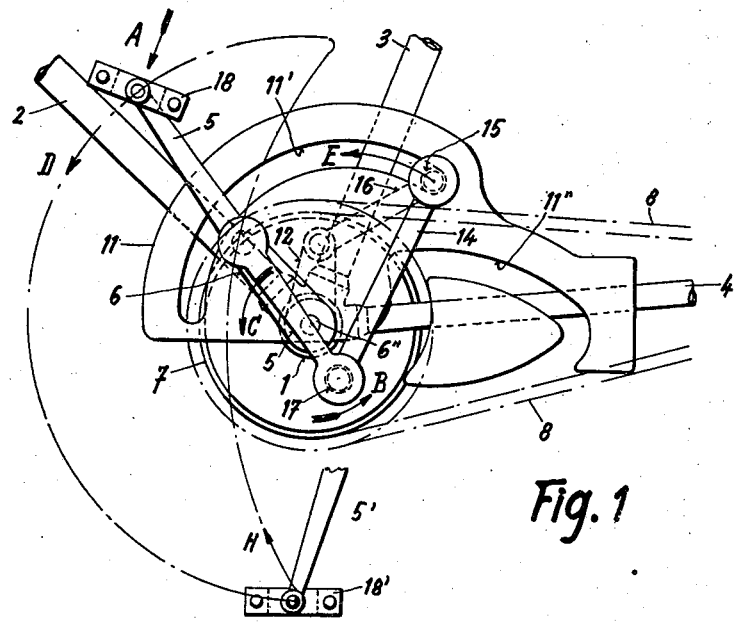
Figure 1 shows a side view of the one left-hand treadle mechanism with the pedal close to the top dead centre at the beginning of the power stroke.
Figure 2:
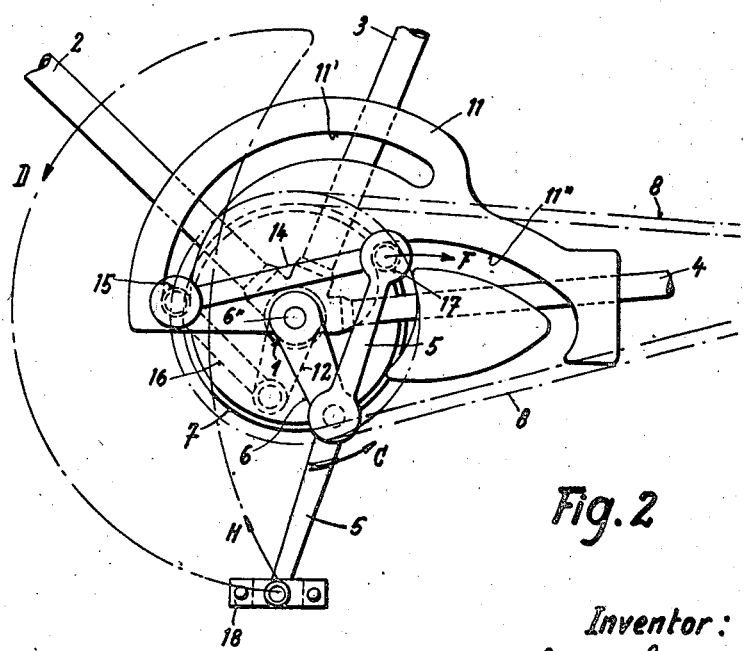
Fig. 2 is the same side view with the pedal in the bottom dead centre towards the end of the power stroke.

In Fig. 2 the power stroke is completed. Thereby pedal 18 has reached its bottom dead centre; roller 15 has completed the curved path 11' and leans now against the left-hand curved way end (on the drawing) respectively against plate 11. At the same time also roller 17 mounted on the rear end of the treadle lever has come to a stop in the left hand upper angle of curved path 11". The pedal 18' shown in Fig. 1 is now uppermost, and is succeeded by the power stroke of the right-hand treadle lever drive. Thereby crank 6 of the left-hand treadle lever drive moves on in the direction of arrow C, pushing hereby roller 17 mounted on the rear treadle lever end in the curved path 11" in the direction of arrow F. By this, roller 15 is raised in the curved path 11' inversely to the direction of arrow E, lever 12 being thereby simultaneously swung in the opposite direction of arrow C until it again reaches the position as indicated in Fig. 3, in which roller 15 has completed the whole curved path 11' and come anew to rest on its right end on plate 11. The remaining parts of the left-hand treadle lever drive take thereby the respective positions as shown in Fig. 3. If crank 6 is moved further on in the direction of arrow 6, link 14 is first swung in the direction of arrow G in Fig. 3, while roller 15 remains for the time being in its position on the right in curved path 11'.

In Fig. 4 the treadle lever is practically again on top and with the further rotation of crank 6 in the direction as indicated by arrow H, the lever reaches shortly afterwards again the initial position for the power stroke as in Fig. 1.

The aforedescribed treadle mechanism can be easily mounted on any standard bicycle, whereby also chain wheel 7 can be utilized again.

According to the choice and requirement, the described treadle lever drive can be also applied in connection with a change speed gear.

What I claim is:

A treadle lever drive, especially for bicycles, comprising double arm levers having pedals at their front ends and adapted for upward and downward motions, said levers being pivoted intermediate their ends to a crank mounted in the treadle bearing of the bicycle, a switch gear coupled to the shaft of said crank, a pair of pivoted links interconnecting said gear and the rear end of the respective levers, and a pair of members arranged on either sides of the bicycle frame and having two spaced curved primary and secondary paths differently eccentered to said shaft, the pivot which connects both links cooperating with the primary path and being so guided thereby that the reaction pressure on said lever rear end during the power stroke is transmitted through said links and gear to said shaft, while during the idle stroke said lever rear end is guided by the secondary path so that after less than half a revolution of said shaft the lever is brought back to its uppermost rocking position.

ADOLF HUBER.